US012736555B2

(12) United States Patent
Ha et al.

(10) Patent No.: US 12,736,555 B2
(45) Date of Patent: Sep. 15, 2026

(54) AUTOMATIC ANALYZER

(71) Applicant: HITACHI HIGH-TECH CORPORATION, Tokyo (JP)

(72) Inventors: Chikook Ha, Tokyo (JP); Youichi Aruga, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 1161 days.

(21) Appl. No.: 17/043,342

(22) PCT Filed: Mar. 19, 2019

(86) PCT No.: PCT/JP2019/011508
§ 371 (c)(1),
(2) Date: Sep. 29, 2020

(87) PCT Pub. No.: WO2019/198445
PCT Pub. Date: Oct. 17, 2019

(65) Prior Publication Data

US 2021/0208176 A1 Jul. 8, 2021

(30) Foreign Application Priority Data

Apr. 13, 2018 (JP) ................................ 2018-077392

(51) Int. Cl.
*G01N 37/00* (2006.01)
*G01N 35/00* (2006.01)
(Continued)

(52) U.S. Cl.
CPC ... *G01N 35/1002* (2013.01); *G01N 35/00732* (2013.01); *G01N 35/0092* (2013.01);
(Continued)

(58) Field of Classification Search
None
See application file for complete search history.

(56) References Cited

U.S. PATENT DOCUMENTS 7,732,212 B1 6/2010 Nakata et al.
2010/0114501 A1 5/2010 Kondou et al.
(Continued)

FOREIGN PATENT DOCUMENTS

EP 3153865 A1 4/2017
JP 2010-107478 A 5/2010
(Continued)

OTHER PUBLICATIONS

Supplementary European Search Report received in corresponding Application No. 19784292.5 dated Dec. 3, 2021.
(Continued)

*Primary Examiner* — Paul S Hyun
(74) *Attorney, Agent, or Firm* — MATTINGLY & MALUR, PC

(57) ABSTRACT

The invention is directed to an automatic analyzer in which information necessary for reagent management is displayed without a decrease in the number of reagents capable of being displayed on the same screen and browsability of reagent information is improved. A display area is compressed by limitation of the number of display items per reagent and the amount of text to be displayed on a first screen, and reagent management items capable of being displayed per screen are magnified by arranging and displaying respective reagents in a matrix form. The respective reagent management item displaying areas are selected using buttons formed at the respective displaying areas, whereby a detailed information display screen of a target reagent is displayed.

5 Claims, 5 Drawing Sheets

(51) Int. Cl.

| | |
|---|---|
| ***G01N 35/10*** | (2006.01) |
| ***G06F 3/04817*** | (2022.01) |
| ***G06F 3/04842*** | (2022.01) |
| ***G06F 3/14*** | (2006.01) |

(52) U.S. Cl.

CPC ...... *G06F 3/04817* (2013.01); *G06F 3/04842* (2013.01); *G06F 3/14* (2013.01); *G01N 2035/00891* (2013.01)

(56) References Cited

U.S. PATENT DOCUMENTS

| | | | |
|---|---|---|---|
| 2010/0115463 A1 | 5/2010 | Kondou | |
| 2010/0271479 A1* | 10/2010 | Heydlauf ......... | G01N 33/54366 715/830 |
| 2012/0179293 A1 | 7/2012 | Feingold et al. | |
| 2017/0205435 A1 | 7/2017 | Hagiwara et al. | |
| 2019/0227090 A1 | 7/2019 | Sasaki et al. | |

FOREIGN PATENT DOCUMENTS

| | | |
|---|---|---|
| JP | 2012-63237 A | 3/2012 |
| JP | 2013-76619 A | 4/2013 |
| WO | 01/067113 A1 | 9/2001 |
| WO | 2015/186446 A1 | 12/2015 |
| WO | 2018/051672 A1 | 3/2018 |

OTHER PUBLICATIONS

International Preliminary Report on Patentability received in corresponding International Application No. PCT/JP2019/011508 dated Oct. 15, 2020.

International Search Report of PCT/JP2019/011508 dated Apr. 16, 2019.

* cited by examiner

[FIG. 1]
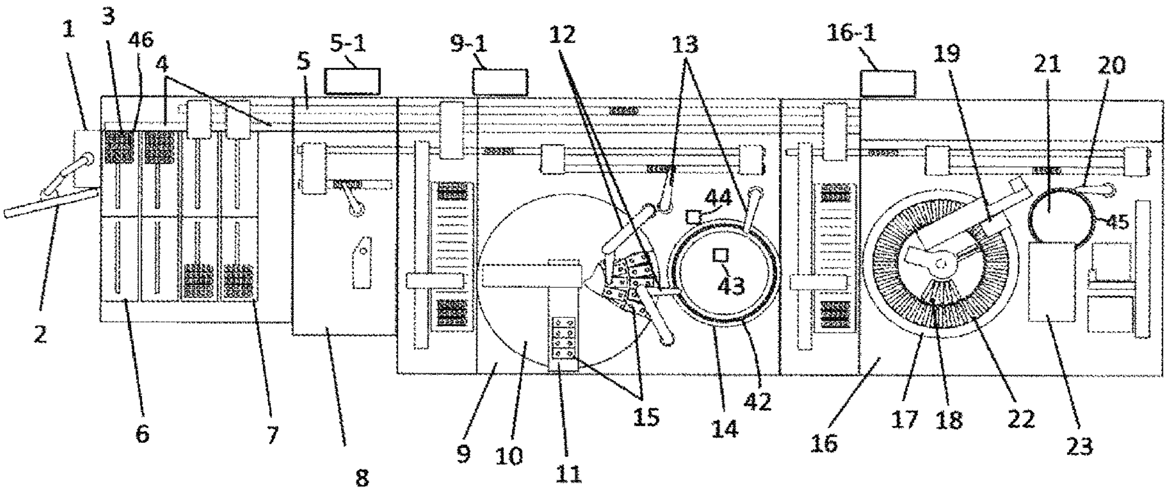
[FIG. 2]
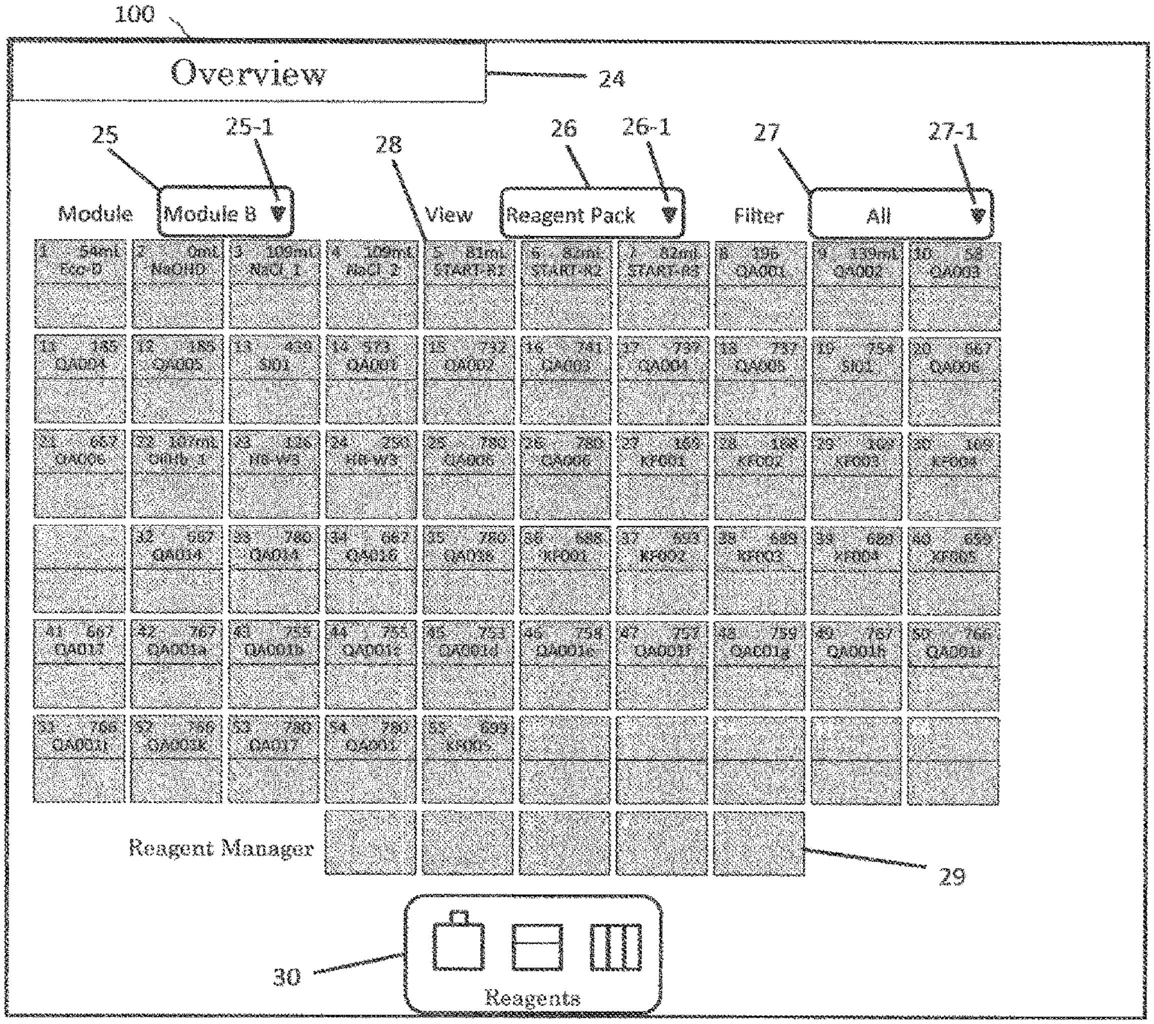

[FIG. 3]

TABLE 1

| | DISPLAY ITEM (SELECTION CANDIDATE) | CONTENTS |
|---|---|---|
| **Module** (ANALYZER) | **Module-A** | ISE ANALYZER |
| | **Module-B** | BIOCHEMICAL ANALYZER |
| | **Module-C** | IMMUNOLOGICAL ANALYZER |
| **View** (REAGENT TYPE) | **Reagent Pack** | ANALYTICAL REAGENT |
| | **Inventory** | CLEANING SOLUTION, OTHERS |
| **Filter** (REAGENT FILTER) | **All** | DISPLAY ALL REAGENTS ON REAGENT DISK |
| | **Calibration Request** | REAGENT THAT NEEDS TO BE CALIBRATED |
| | **QC Request** | REAGENT THAT NEEDS TO BE SUBJECTED TO QUALITY CONTROL |
| | **Required Action** | REAGENT WITH REQUIREMENT |

[FIG. 4]

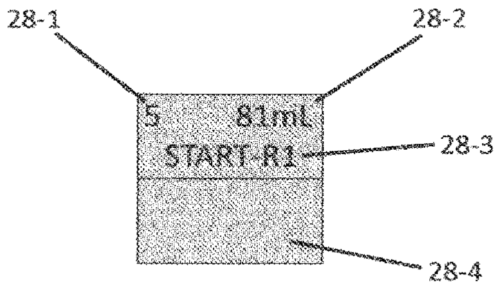

[FIG. 5]

TABLE 2

| DISPLAY COLOR | CONTENTS |
|---|---|
| RED | NO REAGENT IS IN CONTAINER, OR REAGENT WITH REMAINING TEST COUNT OF ZERO EXISTS |
| YELLOW | REAGENT OF NECESSARY CHECK EXISTS |
| GRAY | REAGENT CONTAINER DOES NOT EXIST |
| BLUE | ABOVE-DESCRIBED REAGENTS DO NOT EXIST |

[FIG. 6]

TABLE 3

| DISPLAY COLOR | CONTENTS |
|---|---|
| RED | WHEN REMAINING AMOUNT OR REMAINING TEST COUNT IS ZERO |
| YELLOW | WHEN REMAINING AMOUNT OR REMAINING TEST COUNT IS EQUAL TO LOWER THAN WARNING LEVEL |
| PURPLE | WHEN REMAINING AMOUNT OR REMAINING TEST COUNT IS PRESET LEVEL |
| BLUE | WHEN REMAINING AMOUNT OR REMAINING TEST COUNT DOES NOT REACH ABOVE-DESCRIBED LEVELS |
| GRAY | WHEN REAGENT IS NOT INSTALLED |
| | EXAMPLE: REAGENT POSITION IS VACANT |
| | EXAMPLE: USE OF REAGENT IS RESTRICTED FOR SOME REASONS |

[FIG. 7]

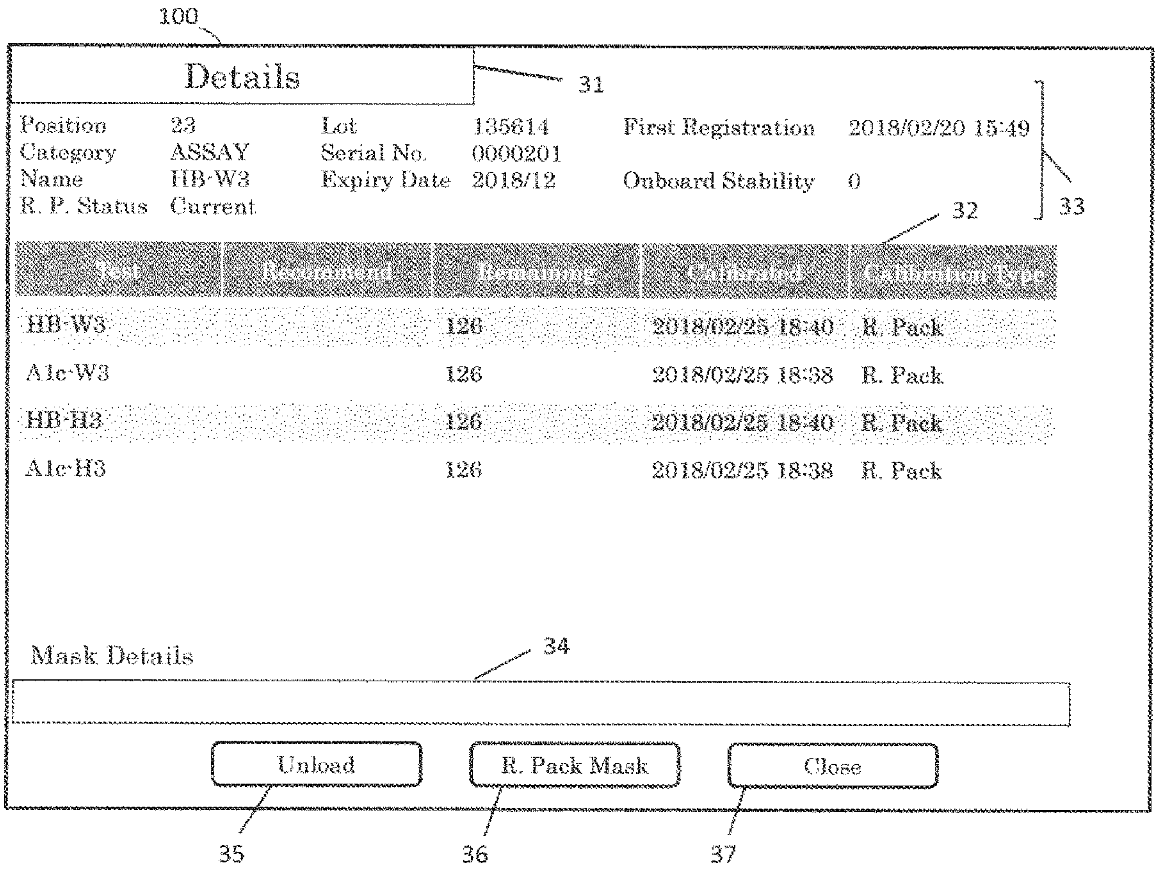

[FIG. 8]
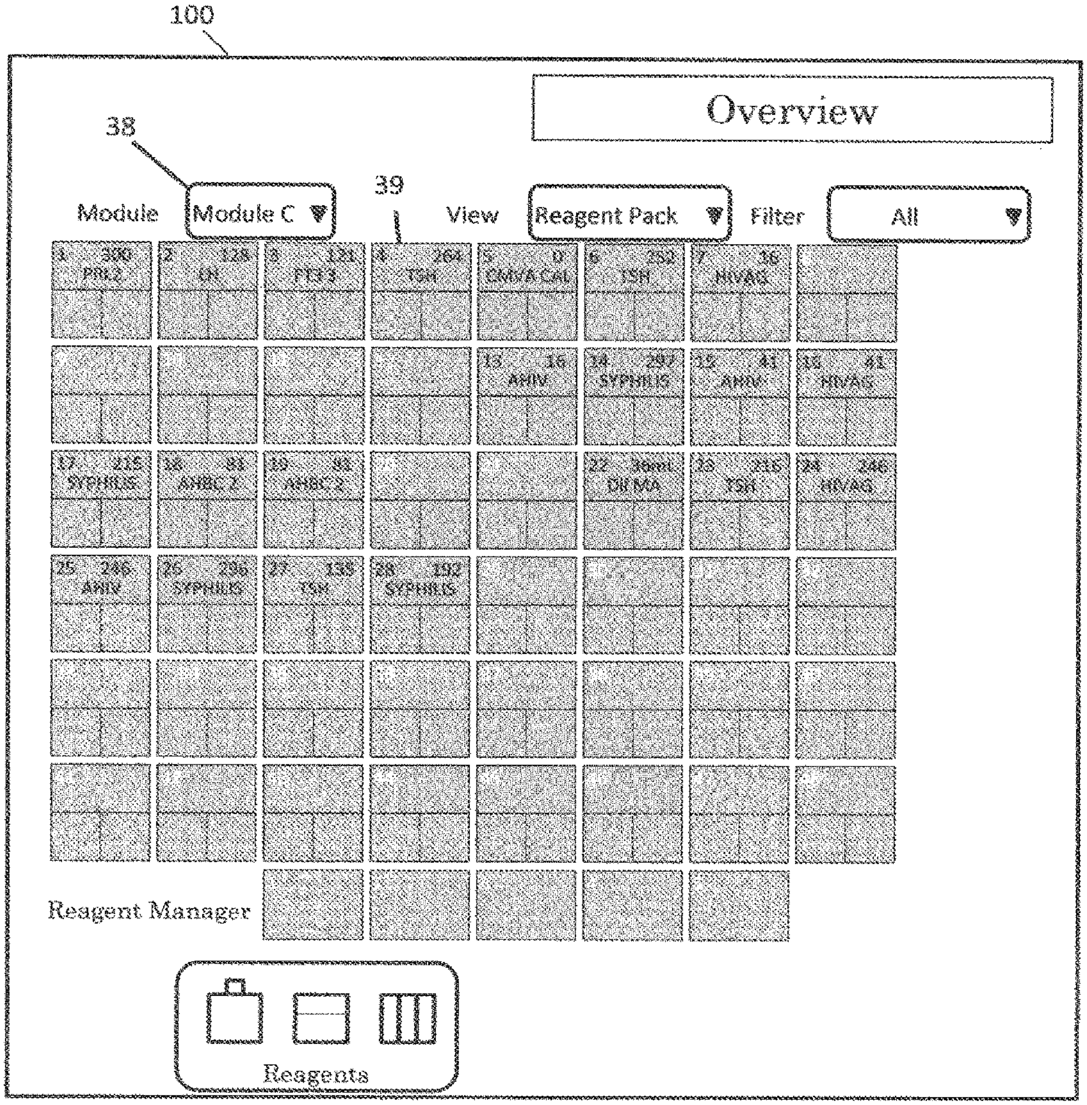
[FIG. 9]
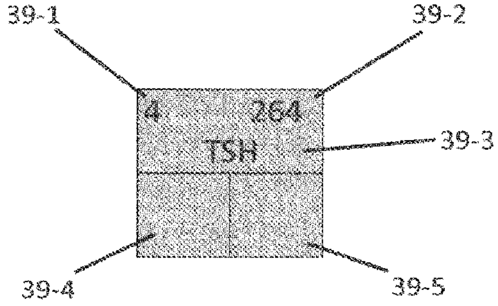

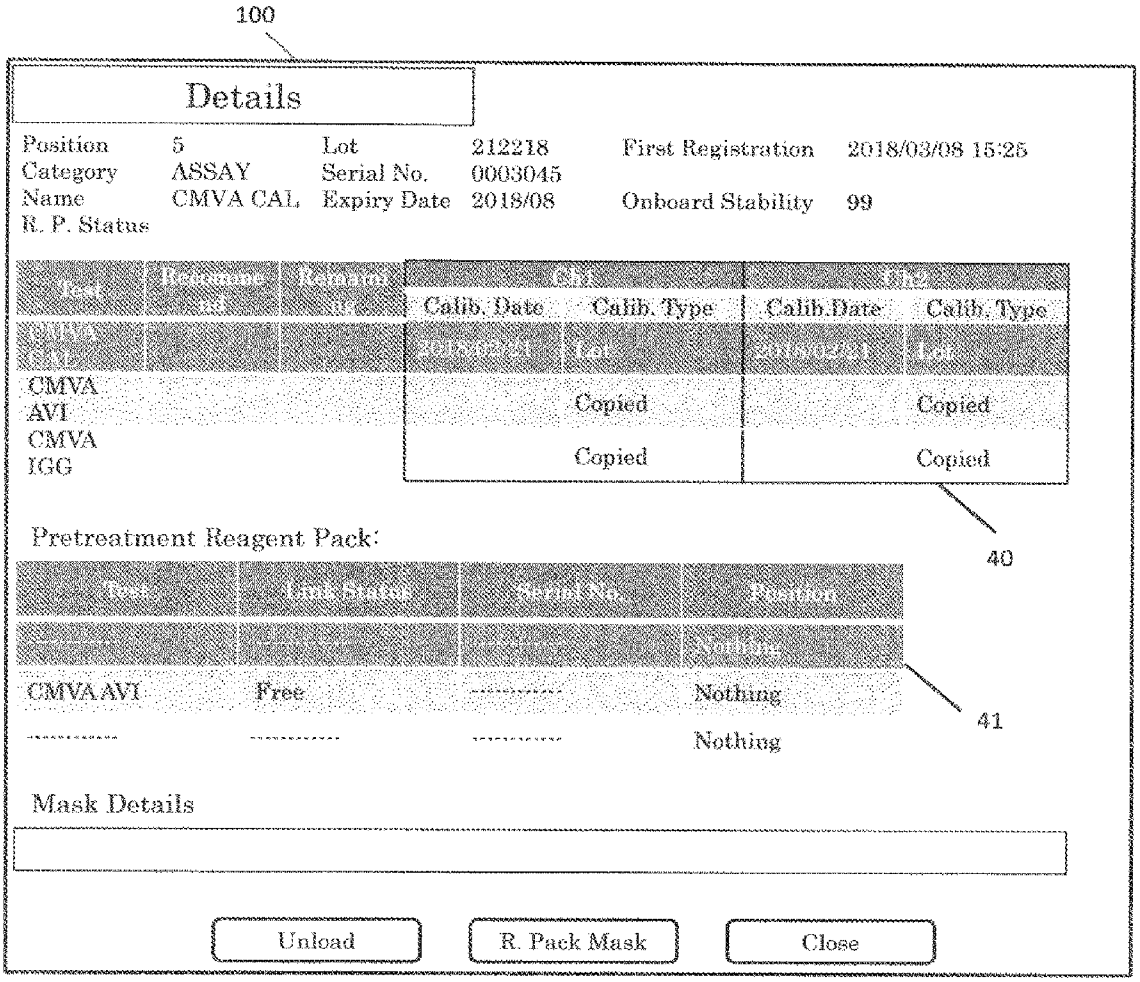

Details

| | | | | | |
|---|---|---|---|---|---|
| Position | 5 | Lot | 212218 | First Registration | 2018/03/08 15:25 |
| Category | ASSAY | Serial No. | 0003045 | | |
| Name | CMVA CAL | Expiry Date | 2018/08 | Onboard Stability | 99 |
| R. P. Status | | | | | |

| Test | Recommended | Remaining | Ch1 | | Ch2 | |
|---|---|---|---|---|---|---|
| | | | Calib. Date | Calib. Type | Calib.Date | Calib. Type |
| CMVA CAL | | | 2018/02/21 | Lot | 2018/02/21 | Lot |
| CMVA AVI | | | | Copied | | Copied |
| CMVA IGG | | | | Copied | | Copied |

40

Pretreatment Reagent Pack:

| Test | Link Status | Serial No. | Position |
|---|---|---|---|
| ---------- | ---------- | ---------- | Nothing |
| CMVA AVI | Free | ---------- | Nothing |
| ---------- | ---------- | ---------- | Nothing |

41

Mask Details

Unload R. Pack Mask Close

AUTOMATIC ANALYZER

TECHNICAL FIELD

The invention relates to an automatic analyzer that performs qualitative and quantitative analysis of biological samples such as blood and urine.

BACKGROUND ART

Recently, along with an increase in the number of items that can be measured by an automatic analyzer, the number of reagents that can be loaded on the automatic analyzer has increased, and reagent information displayed on a screen has increased. Further, along with an increase in processing capacity, the work frequency of reagent replacement or addition has increased. On the other hand, screens as work targets have been diversified, and time and labor (click operation) are required to shift between the screens. Therefore, it is desired to improve operability.

In a technique described in PTL 1, information on each reagent is displayed in one line in a table format.

In addition, in a technique described in PTL 2, reagent information is displayed on a disk-shaped screen corresponding to the arrangement of reagents in a reagent holding area on a reagent disk.

CITATION LIST

Patent Literature

PTL 1: WO01/067113
PTL 2: WO15/186446

SUMMARY OF INVENTION

Technical Problem

However, in the technique described in PTL 1, the number of lines capable of being displayed on a screen is the number of reagents capable of being displayed on a single screen, and it is difficult to further increase the number of reagents capable of being displayed.

In addition, in the technique described in PTL 2, when information on all the reagents are displayed on a single screen, a method of displaying the reagents in a shape simulating the arrangement of the reagents is shown as an example. However, it is difficult to display character information in an amount necessary for the respective reagents, and it is necessary to limit a function of collectively displaying the reagents at the same time. For example, a selected reagent is enlarged and displayed.

An object of the invention is to solve the problems of the related art and to implement an automatic analyzer in which information necessary for reagent management is displayed without a decrease in the number of reagents capable of being displayed on the same screen and browsability of reagent information is improved.

Solution to Problem

In order to achieve the objects, the invention is configured as follows.

An automatic analyzer includes: a reagent container holding unit that holds a plurality of reagent containers for accommodating reagents; a dispensing mechanism that dispenses a reagent and a sample into a reaction vessel; a measurement unit that measures characteristics of a reaction solution between the reagent and the sample accommodated in the reaction vessel; a display unit; and a control unit that stores holding position information of the plurality of reagent containers held in the reagent container holding unit and management information of the reagents accommodated in the plurality of reagent containers, and causes the display unit to display the holding position information and the management information, in which the control unit causes the display unit to display, corresponding to holding positions of the plurality of reagent containers held in the reagent container holding unit, a first screen on which a plurality of reagent management item displaying areas for displaying the management information of the reagents accommodated in the plurality of reagent containers are arranged in a matrix form.

Advantageous Effects of Invention

The invention can implement an automatic analyzer in which information necessary for reagent management is displayed without a decrease in the number of reagents capable of being displayed on the same screen and browsability of reagent information is improved.

BRIEF DESCRIPTION OF DRAWINGS

FIG. 1 is a schematic configuration diagram of an automatic analyzer according to the present invention.

FIG. 2 is a diagram illustrating a screen (first screen) displaying a list of reagent management items of a biochemical analyzer according to Example 1 of the invention.

FIG. 3 is a detailed explanatory table of the reagent management items on the first screen of Example 1.

FIG. 4 is an enlarged view of a display area relating to one reagent out of the reagent management items illustrated in FIG. 2.

FIG. 5 is a table describing an example of a display color displayed on a reagent status display illustrated in FIG. 2.

FIG. 6 is a table describing background colors of the reagent management items to be changed according to states of respective reagents.

FIG. 7 is a diagram illustrating a detailed display screen (second screen) of a target reagent in Example 1.

FIG. 8 is a diagram illustrating a first screen of an immunological analyzer in Example 2.

FIG. 9 is an enlarged view of a display area relating to one reagent out of reagent management items illustrated in FIG. 8.

FIG. 10 is a diagram illustrating a detailed display screen (second d screen) of a target reagent in Example 2.

DESCRIPTION OF EMBODIMENTS

Hereinafter, an embodiment of the invention will be described with reference to the accompanying drawings.

EXAMPLES

Example 1

FIG. 1 is a schematic configuration diagram of an automatic analyzer according to an example of the present invention.

In FIG. 1, the automatic analyzer includes: an ISE analyzer 8 that measures an electrolyte concentration in a sample using an ion selective electrode; a biochemical analyzer 9 that analyzes a biochemical component in a sample by mixing the sample and a reagent with each other in a reaction vessel 42 installed on a reaction disk 14 to react with each other and measuring an absorbance of the reaction liquid of the sample and the reagent with a photometer 44 using light emitted from a light source 43; and an immunological analyzer 16 that analyzes a minor component in blood such as a hormone with high sensitivity by mixing a reagent and a sample in a reaction vessel 45 installed on an incubator 21 to react with each other.

The automatic analyzer further includes: a sample rack supplying unit 6 that supplies a sample rack 3 to supply samples to the analyzers 8, 9, and 16; sample conveying lines 4 and 5 that supply the sample rack 3 from the sample rack supplying unit 6 to the analyzers 8, 9, and 16; a sample rack storing unit 7 that stores the sample rack 3 after completion of the measurement; and a controller for controlling the respective units.

The controller is configured with a control PC 1, a computer 5-1 in the ISE analyzer 8, a computer 9-1 in the biochemical analyzer 9, and a computer 16-1 in the immunological analyzer 16. The control PC 1 includes a monitor (display unit) 2.

For convenience of illustration, the computers 5-1, 9-1 and 16-1 are arranged outside the respective analyzers 8, 9, and 16 in the drawing, but are built int the respective analyzers 8, 9, and 16 in practice.

The sample rack supplying unit 6 supplies the sample rack 3 that holds a plurality of sample containers 46 accommodating patient samples to the analyzers 8, 9, and 16 through the sample conveying line 4, and each of the analyzers 8, 9, and 16 aspirates the sample with a sample probe 13 or a sample probe 20 from the sample container 46 on the supplied sample rack 3 to execute analysis. Next, the sample rack 3 is conveyed on a sample line 5 and is stored in the sample rack storing unit 7.

Next, the summary of the analysis operations of the biochemical analyzer 9 and the immunological analyzer 16 will be described. In the biochemical analyzer 9, as described above, the absorbance of a reaction solution including a reagent and a sample is analyzed. In this case, the sample containers 46 loaded on the sample rack 3 move up to below the sample probe 13 in order of being dispensed, and a predetermined amount of the sample is aspirated by the sample probe 13 and is dispensed into the reaction vessel 42.

The reaction disk 14 in which the reaction vessel 42 accommodating the dispensed sample is installed is arranged to be rotatable in a reaction bath with a controlled constant temperature, the reaction vessel 42 is moved up to a reagent addition position, and a predetermined amount of a reagent that is aspirated by a reagent probe 12 from a reagent container 15 is added to the reaction vessel 42. The reaction vessel 42 to which the reagent is added is moved to a stirring position on the reaction disk 14 and is stirred. When the reagent addition is executed multiple times, the above-described reagent addition and stirring operation is further executed.

The reaction vessel 42 in which the mixture of the sample and the reagent is stirred passes through a light flux emitted from the light source 43, and the absorbance thereof during the passage is measured by the photometer 44. A measurement unit that measures characteristics of the reaction solution using the light source 43 and the photometer 44 is formed. Using the measured absorbance, a component concentration of an analysis item to be analyzed is obtained based on a calibration curve generated before the sample measurement. After completion of the photometry, the reaction vessel 42 is moved up to a cleaning position of the reaction vessel 42 arranged in the vicinity of the reaction disk 14, and the solution in the reaction vessel 42 is discharged. Further, the reaction vessel 42 is cleaned with a detergent and subsequently cleaned with water and is used for the next analysis.

The reagent container 15 storing the reagent is held and stored in the reagent disk 10 (reagent container holding unit) to be detachable from the reagent disk 10 in which the temperature at which the reagent is held is managed. In addition, a reagent is aspirated by a dispensing mechanism and the rotatable reagent disk 10 such that the reagent can be discharged into the reaction vessel 42, the dispensing mechanism including the movable reagent probe 12 that aspirates and discharges liquid. Means for holding and storing the reagent containers 15 is not limited to a disk type, and a serial type or a matrix type in which the reagent containers 15 are arranged in one or more columns may be used.

In the biochemical analyzer 9 according to Example 1, an auto-loader 11 for automatic replacement of the reagent on the reagent disk 10 is provided such that the reagent container 15 on the reagent disk 10 can be discharged and the reagent container 15 to be newly used can be stored in the reagent disk 10 without interrupting the analysis operation.

On the other hand, as in the biochemical analyzer 9, the immunological analyzer 16 is also configured such that a reagent is discharged to the reaction vessel 45 on the incubator 21 by a combination of the dispensing mechanism (the reagent probe 19 and the sample probe 20) and the reagent disk 17 (reagent container holding unit) and the reagent container 22 that is being analyzed is replaced by the auto-loader 18.

In the immunological analysis, a reaction solution is formed by dispensing the sample and the reagent into the reaction vessel 45 and mixing the sample and the reagent with each other, and a reaction progresses by placing the reaction vessel 45 on the incubator 21 with a controlled constant temperature for a predetermined time.

Next, the reaction solution is extracted from the reaction vessel 45, is conveyed to a detection unit 23, a component concentration of a target material bonded to a luminescent marker in the reaction solution is obtained by detecting (measuring) light emission of the marker. The detection unit 23 forms a measurement unit that measures characteristics of the reaction solution.

In the immunological analyzer 16 according to Example 1, the detection unit 23 for detecting light emission includes two channels of detection units that can execute detection independently, and information on reagent management items described below includes items managed per detection unit.

In the ISE analyzer 8, the biochemical analyzer 9, and the immunological analyzer 16, different analytical reagents are used, the reagents are individually stored in the respective analyzers 8, 9, and 16, and information on the analytical reagents is managed and displayed by the control PC 1.

Information (hereinafter, referred to as "reagent management items") regarding the analytical reagents that should be managed by the control PC 1 will be described below. The following reagent management items do not necessarily include all the information and includes at least one of the following items.

First, the reagent management items may include, for example, an analysis item that is analyzed using a reagent, individual ID of reagents accommodated in the reagent containers 15 and 22, a lot ID during manufacturing, a manufacturing date, and a use expiry date. Depending on analysis items, a plurality of reagents are required to be used in combination. Therefore, in this case, the reagent management items include analysis items of reagents to be used in combination. On the other hand, the reagent management items may include the amounts of reagents accommodated in the reagent containers 15 and 22, which include the remaining amounts at the time of use and the amounts of the reagents accommodated at an initial time point and are managed in terms of volume, weight, or number of times of analysis (test count).

The reagent management items are stored in rewritable or read-only storage media belonging to the individual reagent containers 15 and 22. Alternatively, information on all the reagents stored in the reagent disks 10 and 17 are collectively stored in the control PC 1 (are stored and managed in storage means in the control PC 1).

The reagent management items stored in the control PC 1 include position information on positions where the reagent containers 15 and 22 accommodating the reagents are held and reagent state information. When the reagent containers 15 and 22 are conveyed to the analyzers, the reagent management items are read from the storage media belonging to the reagent containers 15 and 22, are conveyed to the controllers 1, 5-1, 9-1, and 16-1, and are collectively managed together with the information on the reagent management items of the other reagent containers 15 and 22 on the reagent disks 10 and 17.

Next, the display of the reagent management items in Example 1 of the invention will be described using FIGS. 2 to 4. FIG. 2 is a diagram illustrating a screen (first screen) displaying a list of a plurality of reagent management item displaying areas 28 of the biochemical analyzer 9 according to Example 1 on a display screen 100 of a monitor 2 of the control PC 1. The name of the display screen is "Overview" (list display screen) displayed on a display screen name area 24. In FIG. 2, the respective reagent management item displaying areas 28 are arranged and displayed in a matrix form including n rows and m columns (n and m each independently represent an integer of 2 or more) in order of numbers corresponding to positions of the reagent containers 15 held in the reagent disk 10 as a reagent container holding unit.

In addition to the display area of the reagent management item displaying area 28, the first screen illustrated in FIG. 2 includes: an analysis module selection displaying area (analyzer selection displaying area) 25 where a reagent to be displayed is designated per analyzer; an analysis module selection button 25-1 for selecting an analysis module (analyzer); a reagent-type selection displaying area 26 that displays the type of a reagent to be displayed; a reagent-type selection button 26-1 for selecting the type of the reagent; a reagent filter displaying area 27 for filtering a reagent to be displayed in terms of the state and designating display/non-display; and a selection button for reagent filter displaying area 27-1.

By operating the selection buttons 25-1, 26-1, and 27-1 through a mouse in the control PC 1 or a touch panel in the monitor 2, a list of selection candidates are displayed such that the items can be selected from the list.

FIG. 3 is a detailed explanatory table of the plurality of reagent management item displaying areas 28 on the first screen of Example 1, which is Table 1 illustrating selection candidate examples of the respective displaying areas 25, 26, and 27. In addition, FIG. 4 is an enlarged view of a display area relating to one reagent out of the reagent management item displaying areas 28 illustrated in FIG. 2.

In FIG. 3, for example, one of display items (All, Calibration Request, QC Request, Required Action) illustrated in the field of the reagent filter displaying area 27 is selected, items (a remaining reagent amount displaying area 28-2, a test name displaying area 28-3, and a recommend 28-4) other than the reagent position displaying area 28-1 illustrated in FIG. 4 can be set to non-display in the display area 28 relating to a reagent (a predetermined type of reagent) other than a display target.

In the first screen illustrated in FIG. 2, a reagent status display 30 is displayed as a display area for displaying the state relating to a reagent. In the reagent status display 30, icons simulating the shapes of the reagent containers used in the respective analyzers Module-A (ISE analyzer), Module-B (biochemical analyzer), and Module-C (immunological analyzer) in Example 1 are displayed (in FIG. 2, are displayed in order of Module-A (ISE analyzer), Module-B (biochemical analyzer), and Module-C (immunological analyzer) from the left), and the states of reagents held in the respective analyzers are represented by display colors of the icons. FIG. 5 is a table describing an example of a display color displayed on the reagent status display 30.

Each of the reagent management item displaying areas 28 relating to a plurality of reagents is configured with the following four items as illustrated in FIG. 4. The four items include: the "reagent position" displaying area 28-1 that displays the position on the reagent disk 10 where the reagent container 15 is held; the "remaining reagent amount" displaying area 28-2 that displays the remaining amount of the reagent at the current time point; the "test name" displaying area 28-3 that displays the analysis item; and the "recommend" displaying area (information displaying area for reagent state) 28-4 that displays a recommended action for the current reagent state information or the reagent state thereof.

The "reagent position" 28-1 field among the above-described items is associated with consecutive numbers sequentially assigned to reagent container holding positions of the reagent disk 10. Since the reagent disk 10 according to Example 1 includes 60 reagent container holding positions, numerals from 1 to 60 are assigned.

Next, in the "remaining amount" field 28-2, the remaining amount of a target reagent is displayed in terms of liquid amount (mL) or remaining test count. Whether the remaining amount is displayed in terms of liquid amount or remaining test count is identified by displaying the unit "mL" together in the case of liquid amount and by displaying only the numeral in the case of remaining test count. In the "test name" 28-3 field, the name (for example, Eco-D, or NaOHD in FIG. 2) of an analysis item is displayed. In the "recommend" 28-4 field, when the use of a reagent is restrited due to some reason described below, the reason for the restriction or an action for releasing the restriction is described. Examples of the use restriction displayed in the "recommend" 28-4 field include: a case where, when it is necessary to use another reagent in combination in analysis where a target reagent is used, the reagent to be used in combination is not present on the reagent disk 10; and a case where the measurement of a quality control sample or the measurement of a standard sample (calibrator) for generating a calibration curve that is required during the use of a reagent is not executed. In either case, the content is abbreviated as in the "recommend" 28-4 field.

The display area of a management item of each of the reagents also has a function as a button for shifting between screens. By selecting the display area (for example, a click operation using a mouse connected to the control PC 1, an instruction operation using a combination of keys on a keyboard, or a touch operation when the display area is displayed on the touch panel-type monitor 2), the screen is shifted from the first screen to a detailed display screen (a second screen in FIG. 7) of the target reagent. FIG. 6 is Table 3 describing background colors of the respective areas of the reagent management item displaying areas 28 to be changed according to states of respective reagents. FIG. 7 is a diagram illustrating the detailed display screen (second screen) of the target reagent.

A screen end (close) button 37 is displayed on the second screen illustrated in FIG. 7, and by selecting the screen end button 37, the screen returns to the display of the first screen.

In addition, the respective reagent management item displaying areas 28 are displayed by the background colors shown in Table 3 illustrated in FIG. 6 according to the states of the reagents. Further, the display color of the character or the numeral to be displayed is red when the expiry date is over. In addition, when the reagent container is not present at the reagent position, only the "reagent position 28-1 is displayed by a white numeral.

In the discharge-scheduled reagent displaying area 29 illustrated in FIG. 2, a predetermined reagent to be discharged by the above-described auto-loader 11 is displayed. In the biochemical analyzer 9 according to Example 1, the auto-loader 11 can store five reagent containers 15. Therefore, in each of the display areas, as illustrated in FIG. 2, one of reagent positions 28-1 including 1 to 5 is displayed. In the discharge-scheduled reagent displaying area 29, the "test name" of the target reagent is displayed in addition to the reagent position. In the example illustrated in the drawing, since no reagents are stored in the auto-loader 11, "test name" is empty and the reagent position 28-1 is displayed by a white font. In addition, the discharge-scheduled reagent displaying area 29 has a button function for shifting between screens, as in the reagent management item displaying area 28, and by selecting the display area, the second screen of the target reagent is displayed.

In Example 1, in each of the reagent management item displaying area 28 and the discharge-scheduled reagent displaying area 29, the number of reagent container holding positions on the reagent disk 10 or display areas corresponding to the number of reagent containers stored in the auto-loader are displayed. When no reagent is present at the corresponding position or when the item is excluded from the display target in the reagent filter displaying area 27, only the reagent position 28-1 is displayed by a white fond, and the display position is not changed. In another method, in the above-described two examples, only the reagent management item displaying area 28 and the discharge-scheduled reagent displaying area 29 of the reagent of the display target may be displayed without displaying the reagent position 28-1. In this case, in the reagent management item displaying area 28 and the discharge-scheduled reagent displaying area 29 that are not displayed, display spaces are generated. Therefore, by reducing spaces between the reagent display areas that are being displayed, the display space can be compressed.

On the second screen, as illustrated in FIG. 7, detailed information (display screen name (detailed display screen) 31) of the selected reagent is displayed in a table format. Therefore, in the screen, for each analysis item of the designated reagent, the detailed information is displayed in a table format in the information display area for each analysis item 32. In addition, common information is displayed in a common information displaying area 33 irrespective of the analysis item.

The information displayed in the information display area for each analysis item 32 include any one of an analysis item name (Test), recommended information (Recommend), a remaining amount of reagent (Remaining), a calibration execution date (Calibrated), and a calibration method (Calibration Type).

In addition, in the common information displaying area 33, any one of a reagent position (Position (common to 28-1)), a reagent type category (Category), a lot number (Lot), an expiry date (Expiry Date), an analyzer storing and registration date (First Registration), and the like is displayed.

Regarding a reagent of which the use is restricted, the second screen includes a detailed display area for reagent mask information 34 where the detailed content of the restriction is displayed. In addition, a selection button for discharge reagent 35 (Unload) for selecting a reagent to be discharged by the auto-loader 11 and a selection button for reagent mask 36 (R. PackMask) for allowing a user to select ON/OFF of the reagent use restrction are arranged together with the above-described screen end button 37, and by selecting the buttons through the mouse operation or the like of the control PC 1, the above-described processes can be instructed.

As described above, according to Example 1, a display area is compressed by limitation of the number of display items per reagent and the amount of text to be displayed on the first screen illustrated in FIG. 2, and reagent management items capable of being displayed per screen are magnified by arranging and displaying respective reagents in a matrix form.

Further, by using each of the display areas of the reagent management items as a selection button and selecting the button to display the detailed information display screen (second screen in FIG. 7) of the target reagent, the detailed information can be easily achieved, and the detailed information necessary for reagent management can be achieved while magnifying the number of reagents capable of being displayed on a single screen.

Accordingly, it is possible to implement an automatic analyzer in which, when reagents to be loaded are displayed, information necessary for reagent management can be achieved without reducing the number of reagents capable of being displayed on the same screen and a screen for achieving more detailed information can be smoothly displayed according to the status.

Example 2

Next, Example 2 regarding the display of the first screen will be described using FIGS. 8 to 10.

FIG. 8 is a diagram illustrating the first screen of the immunological analyzer 16 in Example 2, in which the analysis module selection displaying area 38 displaying "Module-C" is displayed by selecting Module-C (immunological analyzer 16) in the analysis module selection button 25 described in Example 1. In addition, FIG. 9 is an enlarged view of a display area relating to one reagent out of reagent management items illustrated in FIG. 8.

In FIG. 8, the "Recommend" field (a recommend displaying area (Ch1) 39-4, and a recommend displaying area (Ch2) 39-5 illustrated in FIG. 9) in the reagent management item displaying area 39 relating to each of the reagents in the immunological analyzer 16 is divided into two areas and displayed. The immunological analyzer 16 according to Example 2 has a configuration of display areas corresponding to the two detection units (the two channels of detection units) as described above, and the display contents of the "Recommend" fields 39-4 and 39-5 associated with the detection units are displayed for each of the detection units (Ch1, Ch2).

For example, the calibration, the quality control, or the like is executed for each of the detection units. Therefore, the necessity of the calibration, the quality control, or the like and information on whether or not to execute the calibration, the quality control, or the like are managed and displayed for each of the detection units.

The reagent disk 17 in the immunological analyzer 16 according to Example 2 includes 48 reagent container holding positions. Therefore, in the reagent management item displaying area 39, 8 rows×6 columns=48 positions are displayed corresponding to holding positions of reagent containers held in the reagent disk 17 as the reagent container holding unit, and numerals from 1 to 48 are assigned to the reagent position displaying area 39-1. The remaining test count is displayed in a remaining test count displaying area 39-2.

The reagent-type selection displaying area and the reagent filter displaying area have a function common to that of the biochemical analyzer 9 according to example 1 and display selection candidates (Table 1) illustrated in FIG. 3.

FIG. 10 is a diagram illustrating a detailed display screen (second screen) in Example 2. In FIG. 10, on the second screen, among the information displayed in the information display area for each analysis item 40, the calibration execution date (Calibrated) and the calibration method (Calibration Type) are displayed for each of the detection units (Ch1, Ch2) as in the recommend fields 39-4 and 39-5 on the first screen (refer to FIG. 9).

In addition, a combination reagent information displaying area 41 is a display field regarding another reagent that is used in combination with a reagent displayed in the test name displaying area 39-3 of the reagent management item displaying area 39, and displays information on a reagent for a pretreatment of analysis in Example 2.

Information displayed in the combination reagent information displaying area 41 includes any one of information on the analysis item name (Test), a loading status (Link Status) of the reagent to be used in combination, a serial number (Serial No.) of a reagent, and the reagent position (Position).

In Example 2, other displays are the same as those of Example 1.

According to Example 2, the same effects as those of Example 1 can be obtained, not only information on the reagent displayed in the reagent management item displaying area 39 but also information on whether or not the reagent to be used in combination with the displayed reagent is present can be easily searched for as the information on the reagents to be displayed, and detailed information on the reagents loaded on each of the analyzers (the ISE analyzer 8, the biochemical analyzer 9, and the immunological analyzer 16) can be grasped.

The reagent probe 12 and the sample probe 13 can be defined as the dispensing mechanism for dispensing a reagent and a sample into the reaction vessel 42. In addition, the reagent probe 19 and the sample probe 20 can be defined as the dispensing mechanism for dispensing a reagent and a sample into the reaction vessel 45.

REFERENCE SIGNS LIST

1: control PC
2: monitor
3: sample rack
4, 5: sample conveying line
5-1, 9-1, 16-1: computer
6: sample rack supplying unit
7: sample rack storing unit
8: ISE analyzer
9: biochemical analyzer
10, 17: reagent disk
11, 18: auto-loader
12, 19: reagent probe
13, 20: sample probe
14: reaction disk
15, 22: reagent container
16: immunological analyzer
21: incubator
23: detection unit
24: display screen name area (list display screen)
25: analysis module selection displaying area
25-1: analysis module selection button
26: reagent-type selection displaying area
26-1: reagent-type selection button
27: reagent filter displaying area
27-1: selection button for reagent filter displaying area 28: reagent management item displaying area
28-1, 39-1: reagent position displaying area
28-2: remaining reagent amount displaying area
28-3, 39-3: test name displaying area
29: discharge-scheduled reagent displaying area
30: reagent status display
31: display screen name (detailed display screen)
32: information display area for each analysis item
33: common information displaying area
34: detailed display area for reagent mask information
35: selection button for discharge reagent
36: selection button for reagent mask
37: screen end button
38: analysis module selection displaying area
39: reagent management item displaying area
39-2: remaining test count displaying area
39-4: recommend displaying area (Ch1)
39-5: recommend displaying area (Ch2)
40: information displaying area for each analysis item
41: combination reagent information displaying area
42, 45: reaction vessel
43: light source
44: photometer
46: sample container

The invention claimed is:

1. An automatic analyzer comprising:
a plurality of analysis modules, each including:
a reagent container holding unit that holds a plurality of reagent containers for accommodating reagents;
a dispensing mechanism that dispenses a reagent and a sample into a reaction vessel;
a measurement unit that measures characteristics of a reaction solution between the reagent and the sample accommodated in the reaction vessel; and
an auto-loader that stores the reagent containers in the reagent container holding unit and discharges the reagent containers held in the reagent container holding unit from the reagent container holding unit;
a display unit; and
a control unit, coupled to the display unit, configured to:
determine that use of a reagent, among the reagents, is restricted, and upon determining the use of the reagent is restricted, store, in management information, information indicating a reason that use of the reagent is restricted, store holding position information of the plurality of reagent containers held in the reagent container holding unit and the management information of the reagents accommodated in the plurality of reagent containers, the management information including, for each reagent, a remaining reagent amount, a name of the test using the reagent, and the information indicating the reason that use of the reagent is restricted, and display on the display unit, a first screen simultaneously including:

a matrix of positions having n rows and m columns (m and n are integers greater than 2), each position in the matrix respectively corresponding to the position of the reagent containers in the reagent container holding unit of a selected analysis module among the plurality of analysis modules, each position in the matrix respectively displaying reagent management item displaying area for the reagent held in the position in the reagent container holding unit, and each reagent management item displaying area includes a numerical value indicating the position of the reagent container in the reagent container holding unit, the remaining reagent amount, the name of the test using the reagent, and the information indicating the reason that use of the reagent is restricted, a discharge-scheduled reagent displaying area that displays display areas corresponding to the number of reagent containers stored in the auto-loader, each of the display areas displaying a reagent scheduled to be discharged from the reagent container holding unit by the auto-loader, and a plurality of icons that respectively represent a status of reagents held in each analysis module, wherein the icons respectively display a color corresponding to the status of the reagents held in each of the plurality of analysis modules, wherein the first screen includes:

a first selection button for selecting a predetermined type of reagent, and only the reagent management item displaying area of the type of reagent selected by the selection button displays the holding position information of the reagent container, the remaining reagent amount, the name of the test, and a recommended action, a second selection button which, upon selection, displays a list of candidates being the plurality of analysis modules to be selected, and a third selection button which, upon selection, displays a list of candidates of reagent filters to be selected, and wherein a reagent management item displaying area of a type of reagent that is not selected by the selection button displays only the holding position information of the corresponding/respective reagent container, wherein the control unit is configured to:

receive a selection of one of the candidates being the plurality of analysis modules, the received selection being the selected analysis module, and receive a selection of one of the candidates of reagent filters, which upon selection filters reagents to be displayed, wherein the first screen is displayed in a whole display area of the display unit, and wherein the control unit is further configured to:

receive a selection of a reagent management item displaying area in the matrix, and in response to receiving the selection, transition from displaying the first screen to displaying a second screen in the whole display area of the display unit that displays detailed information of the selected reagent of the selected reagent management item displaying area.

2. The automatic analyzer according to claim 1, wherein the second screen displays information of a reagent to be used in combination with the reagent of the selected reagent management item displaying area, according to the selection on the first screen.

3. The automatic analyzer according to claim 1, wherein the control unit receives a selection of a discharge-scheduled display area in the matrix, wherein the control unit is configured to, upon the selection of the discharge-scheduled display area in the matrix, display detailed information of the reagent corresponding to the selection of the discharge-scheduled display area.

4. The automatic analyzer according to claim 1, wherein the control unit is configured to display, on the first screen, a reagent filter displaying area for selecting a predetermined type of reagent.

5. The automatic analyzer according to claim 1, wherein the auto-loader is capable of storing a plurality of reagent containers.

* * * * *